United States Patent [19]

Rosman

[11] Patent Number: 4,710,332
[45] Date of Patent: Dec. 1, 1987

[54] PROCESS OF INJECTION MOLDING A LASER MIRROR SUBSTRATE

[75] Inventor: Irwin E. Rosman, Woodland Hills, Calif.

[73] Assignee: Rockwell International Corporation, El Segundo, Calif.

[21] Appl. No.: 368,542

[22] Filed: Apr. 15, 1982

[51] Int. Cl.4 .............. B29C 45/16; B32B 18/00; B32B 31/00
[52] U.S. Cl. ................................ 264/60; 264/63; 264/255; 264/308; 264/328.7
[58] Field of Search .............. 264/60, 63, 67, 328.1, 264/328.7, 255, 308

[56] References Cited

U.S. PATENT DOCUMENTS

| | | | |
|---|---|---|---|
| 3,422,173 | 1/1969 | Bergstrom | 264/67 |
| 3,725,186 | 4/1973 | Lynch | 264/60 |
| 3,809,733 | 5/1974 | Sandiford | 264/328.7 |
| 3,865,915 | 2/1975 | Garner | 264/328.7 |
| 3,883,629 | 5/1975 | Garner | 264/328.7 |
| 4,000,110 | 12/1976 | Saito | 264/328.1 |
| 4,046,612 | 9/1977 | Wainer | 264/60 |
| 4,076,788 | 2/1978 | Ditto | 264/255 |
| 4,123,488 | 10/1978 | Lawson | 264/255 |
| 4,137,628 | 2/1969 | Suzuki | 264/67 |
| 4,216,184 | 8/1980 | Thomas | 264/328.1 |
| 4,233,256 | 11/1980 | Ohnsorg | 264/63 |
| 4,396,572 | 8/1983 | Batigne | 264/60 |

*Primary Examiner*—Jeffery Thurlow
*Assistant Examiner*—Leo B. Tentoni
*Attorney, Agent, or Firm*—H. Fredrick Hamann; Harry B. Field; Lawrence N. Ginsberg

[57] ABSTRACT

A method of making a laser mirror substrate having a network of cooling passages in which a plurality of separate plates are injection molded from a mixture of particulate material and binder. The molded plates are combined in a stack to form a unitary body which is then processed to fuse the particulate matter and remove the binder. The individual plates are formed with a pattern of holes which are aligned with the holes in the other plates of the stack to provide passages through the unitary body.

7 Claims, 12 Drawing Figures

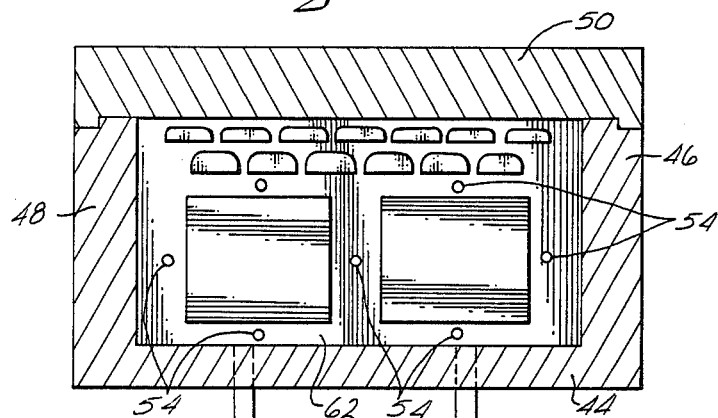
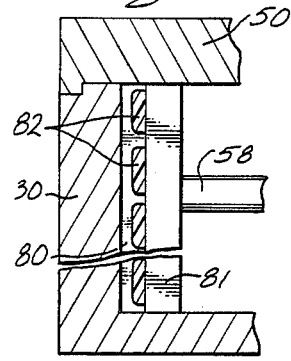
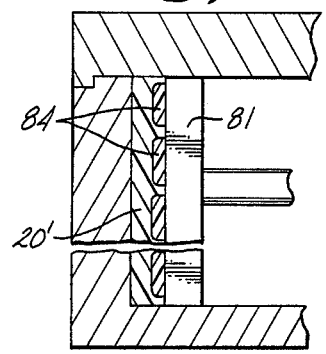
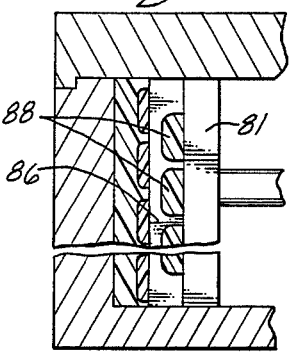
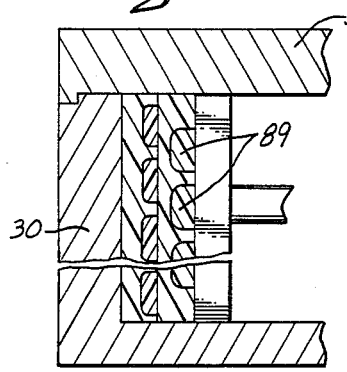
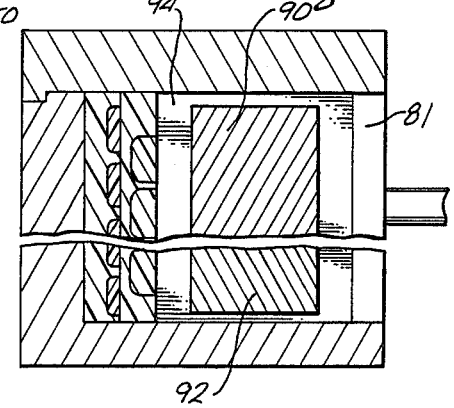

PROCESS OF INJECTION MOLDING A LASER MIRROR SUBSTRATE

FIELD OF THE INVENTION

This invention relates to a method of forming a laser mirror substrate using an injection molding process.

BACKGROUND OF THE INVENTION

Laser mirrors must be free from distortion of the reflective surface. It has been the practice to make the mirror substrate of a material having high heat conductivity, a high modulus of elasticity and a low coefficient of expansion, such as molybdenum. A coolant is circulated close to the mirror surface to prevent surface temperature build-up and to equalize the temperature throughout the substrate. The size and spacing of the coolant passages is critical in reducing both thermal and pressure distortion of the mirror surface. This requires a network of very small, closely spaced fluid passages close to the surface of the mirror. Making such a substrate by machining coolant passages in a single block of metal or forming the substrate from several plates of metal which are machined and brazed together is an extremely costly method of producing high-performance laser mirrors.

SUMMARY OF THE INVENTION

The present invention is directed to an improved method of forming the substrate for high-performance laser mirrors which results in a superior product and is less time consuming and considerably less expensive. The present invention utilizes a process for forming shaped articles from particulate material which is mixed with a binder and molded into a desired shape, the molded product being called a "green" body. The green or molded body is then processed to remove the binder and fuse the particulate matter by sintering. A preferred process for manufacturing parts from particulate matter is described in U.S. Pat. No. 4,197,118.

BRIEF DESCRIPTION

Molding a mirror substrate in the form of a "green" body before fusing presents several problems, however. Because of the intricate network of cooling passages required, making a mold having the coring required to form the cooling passages would be very costly and difficult to make. Moreover, because of the length of the passages relative to their very small cross-section, the cores would have to be made of long strands of thin material. Such cores would be subject to damage and could be easily distorted during the injection of the molding material or the removal of the molded body from the mold.

The present invention provides a process for making the substrate in which a plurality of plates are individually molded as "green" bodies from a mixture of particulate matter and plastic binder. The plates are joined in a stack and then sintered to fuse the particulate matter in the plates into a homogeneous body forming the mirror substrate. Holes in the individual plates are aligned when the plates are joined in a stack to form the coolant passages.

DESCRIPTION OF THE DRAWINGS

For a better understanding of the invention, reference should be made to the accompanying drawings, wherein:

FIG. 7 is a sectional view taken substantially along the line 2—2 of FIG. 2; and FIGS. 8-12 are a sequence of views of an alternative molding process.

DETAILED DESCRIPTION

Figure 1:
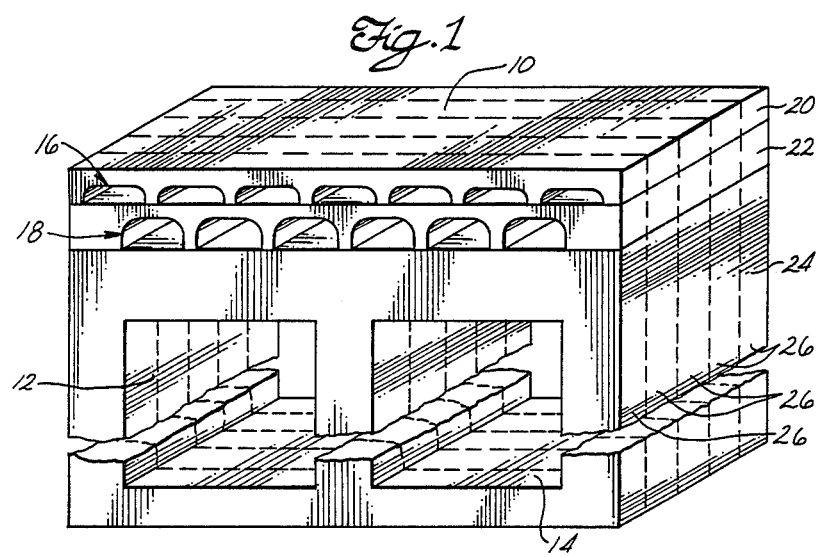
FIG. 1 is an isometric view of a mirror substrate.

Referring to the drawings in detail, FIG. 1 shows an example of a laser mirror substrate made by the process of the present invention. The mirror substrate is in the form of a rectangular block having a top surface 10 which provides the mirror surface. The block is formed with lightening holes 12 and 14. Several layers of passages for circulating coolant are positioned in the block immediately adjacent the top surface 10, as indicated by the two layers of coolant passages indicated at 16 and 18. The coolant passages must be positioned as close to the mirror surface as practicable, and the size and spacing is critical with respect to both thermal and pressure distortion of the mirror. The length of the substrate and the coolant passages, by way of example, may be of the order of 6 inches while the upper layer of fluid passages may be only 0.020 inches in height and 0.080 inches in width and spaced only 0.020 inches from the mirror surface.

In the past it has been the practice to machine the substrate from several horizontal metal plates, such as indicated at 20 and 22, and a larger block of material 24. The fluid passages 16 and 18 are machined as grooves in one surface of the respective plates 20 and 22 and then the plates are brazed together to form the substrate. This fabricating technique has proved very costly. The present invention is directed to a method of manufacturing the mirror substrate utilizing forming techniques described in U.S. Pat. No. 4,197,118, for example. Such a technique involves mixing particulate matter such as a metal, an alloy or a ceramic powder with a suitable binder and then molding or otherwise forming the mixture into the desired shape. At this stage the molded mixture is referred to as a "green" body. The green body is then fired to drive off the binder and fuse the particulate material into a solid body having the desired shape. However, molding a green body to form the mirror substrate of the type shown in FIG. 1 presents a serious coring problem. Because the fluid passages are quite long in relation to their cross-sectional size, it is difficult to provide cores for the fluid passages that are sufficiently strong and rigid to withstand the molding process. The cores tend to break or to bend, making it impossible to maintain the critical spacing and size of the passages which are required to minimize mirror distortion.

The method of the present invention utilizes the process described in the patent in a different way. The mirror substrate, instead of being molded in a single molding operation to form the green body, is molded as a plurality of separate plates which correspond to vertical slices of the substrate, as indicated at 26 in FIG. 1.

Coring a mold for forming the openings in a thin plate eliminates the problem of having long cores that tend to bend and distort, since the length of the cores need only be equal to the thickness of the individual plates. After the individual plates are molded in the desired cross-sectional shape of the mirror substrate, a plurality of the plates are stacked together to provide the desired length of the substrate. The plates are stacked in a vertical stack so that they are held together by gravity. The stack is then processed to drive off the binder and to sinter the remaining particulate matter to form a rigid homogeneous body suitable for use as a mirror substrate. Once the binder has been removed, the particulate matter remaining fuses together, eliminating the boundaries which exist between the individual green body plates. Gravity provides sufficient force to produce fusing across the boundaries once the binder is removed.

An alternative and preferred method of carrying out the invention is shown in FIGS. 2 through 7 in which the green body is formed by a sequential molding process. By this process, each plate is molded in sequence and in direct contact with the surface of the previously molded plate. The sequential molding may be accomplished by a mold having an end wall 30 forming one face of a mold cavity 32. The opposing face of the mold cavity 32 is provided by a movable member 34 in the form of a die 36 having male die members such as indicated at 38, 40 and 42 projecting toward and initially engaging the end wall 30. The edges of the mold cavity 32 are formed by the inner surface of the bottom wall 44 and integral side walls 46 and 48 of the mold body. A removable top wall 50 normally forms the top of the mold cavity.

Initially the width of the mold cavity between the end wall 30 and the opposing face of the moving wall member 34 is equal to the desired thickness of one of the individual plates from which the substrate is to be constructed. This space is bridged by the male mold members 38, 40 and 42 which are shaped, as shown in FIG. 2, to the cross-sectional size of the fluid passages 16 and 18 and the lightening passages 12 and 14, respectively.

Figure 2:
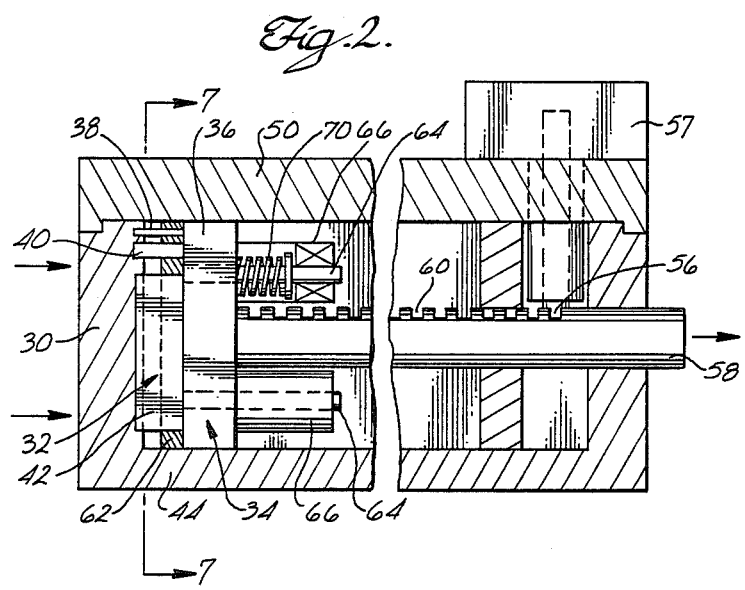
FIG. 2 is a sectional view of a mold used in the process of the present invention.
Figure 3:
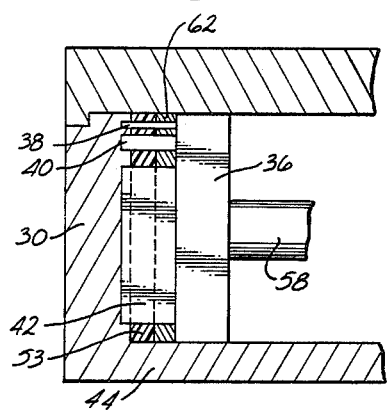
FIGS. 3-6 are a sequence of partial views in section showing the mold of FIG. 2 in various stages of operation.

With the moving wall member 34 of the mold in the position shown in FIG. 2, a suitable mixture of particulate matter and binder is injected into the mold cavity 32 through a series of openings 54 in the face of the moving wall mold cavity. The molded material is indicated at 53 in FIG. 3. The mixture is distributed to these openings through suitable passages (not shown) connecting the openings to a high-pressure source of the mixture using conventional injection molding techniques.

Figure 4:
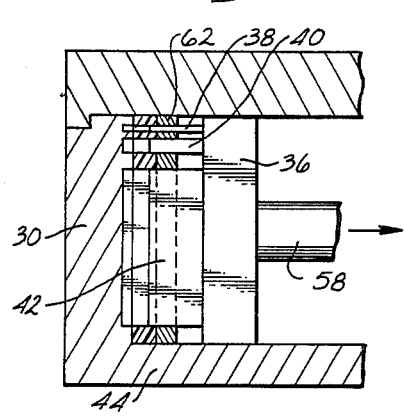

After the first plate is molded, a detent 56 actuated by a solenoid 57, for example, and engaging one of a series of notches 60 in a positioning rod 58, is withdrawn from a notch to release the rod. The rod 58 is secured to and moves with the die 36. This allows the die 36 and positioning rod 58 to be retracted to enlarge the mold cavity. Movement of the die is accomplished by making the front face of the moving wall of the cavity in the form of a stripper plate 62 which has openings in the face of the plate through which the male mold members 38, 40 and 42 project into the cavity from the die 36. The stripper plate is attached to rods 64 which extend through openings in the die 36 and project into solenoids 66 and are journaled and mounted on the back of the die. When the solenoids 66 are energized, they force the stripper plate 62 in a direction toward the end wall 30. But since the stripper plate is prevented from moving in this direction due to the presence in the mold of the previously molded plate, the solenoids cause the die 36 and positioning rod 58 to be moved away from the end wall 30, as shown in FIG. 4. This allows the next notch 60 to be engaged by the detent 56.

Figure 5:
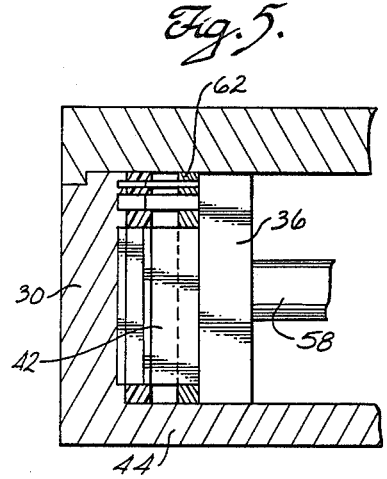
Figure 6:
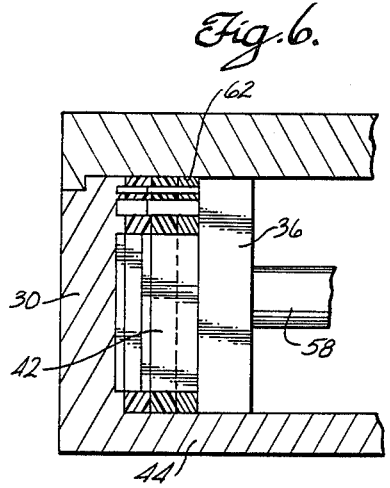

When the solenoids 66 are deenergized, springs 70 retract the stripper plate, opening up a space between the face of the stripper plate and the previously molded plate, as shown in FIG. 5. Thus a new cavity space is formed between the face of the stripper plate 62 and the face of the previously molded plate, which remains in the mold. Additional molding mix is then injected into this new space and an added layer of molded material is added, as indicated in FIG. 6. By repeating this operation, additional layers are added one at a time to the green body until the desired length is achieved. The mold is then opened and the green body is removed from the mold. The green body is then processed to fuse it into a solid substrate.

This sequential molding process has the advantage that much more intimate contact between the layers formed by the individually molded plates is achieved. This eliminates any chance that slight voids may occur in the fused body due to irregularities in the mating surfaces of the stacked plates.

An alternative embodiment of the invention is shown in FIGS. 8–12 in which the green body forming the substrate is molded in three horizontal sections corresponding to the sections 20, 22 and 24 shown in FIG. 1. A mold similar to that shown in FIGS. 2 and 3 may be used to mold the plates 20 and 22 sequentially. FIG. 8 shows the mold having a cavity 80, the proper size to form the plate 20. The face of a moving wall 81 is provided with a series of removable metal fingers 82 having the cross-sectional shape of the required coolant passages 16. The mixture is then injected into the cavity 80 under pressure to form a green body the shape of the horizontal plate 20. The mold fingers 82 are then withdrawn, leaving spaces into which a plastic resin is injected. The resin merely acts as a filler which can be later removed by the same process that removes the binder from the green body. The resulting molded plate is shown at 20′ in FIG. 9 and the molded resin filler is indicated at 84.

The moving wall 81 of the mold is then retracted by an amount equal to the thickness of the second horizontal plate 22 to form a cavity 86. See FIG. 10. Metal fingers 88 are inserted into the cavity adjacent the moving wall 81 to form the desired fluid passages 18 in the molded body. After the mixture is injected into the cavity 86, the mold fingers 88 are withdrawn and a plastic resin is injected in place of the removed fingers, as indicated at 89 in FIG. 11.

As shown in FIG. 12, the moving wall 81 is then backed off by the thickness of the block 24, and core members 90 and 92 are inserted, which bridge the newly formed cavity 94 to form the lightening holes 12 and 14. The mixture is then injected into the newly formed cavity 94 to complete the molding process. The green body forming the molded substrate is then processed to remove the binder and remove the plastic resin from the filled openings to form the coolant passages 16 and 18. The remaining particulate matter is then fused by sintering in the manner described in the above-identified patent.

From the above description, it will be seen that a method is provided for forming metal or ceramic parts having intricate passages through the part which could not effectively be cored in conventional injection molded dies. By molding the green body in sections sequentially, the molding cavities can be kept very small, as can the length of the cores which must bridge the cavity.

It is to be understood that what has been described is merely illustrative of the principles of the invention and that numerous arrangements in accordance with this invention may be devised by one skilled in the art without departing from the spirit and scope thereof.

What is claimed is:

1. A sequential process for forming a molded article from molded plates formed in sequence in serial abutment with each other in a mold, said mold having a cavity therein defined by walls the back wall being movable and one or more of the other walls bearing injector openings, dies for forming passages within and extending therethrough said plates, said dies projecting from said movable wall toward one of the non-movable walls, said process comprising the steps of:
   (1) injecting a mixture of inorganic particles and a resin binder into said cavity between the die-bearing movable wall and said non-movable wall and molding a plate therefrom having passages extending therethrough formed by said dies;
   (2) moving said movable wall away from said molded plate to form another cavity in said mold adjacent to said molded plate;
   (3) injecting a second mixture of inorganic particles and resin binder into the cavity formed in step 2 to mold another plate; and
   (4) repeating steps 2 and 3 at least once to form a stack of abutting, molded plates which comprise a molded article containing passages therein formed by said dies.

2. A process as in claim 1, further comprising the step of:
   (5) heating the molded article to remove the resin and to fuse the intra-and inter-plate inorganic particles into a homogenous solid.

3. A process as in claim 1, further including the steps of:
   moving said passage-forming dies out of the plate after each said plate is molded and injecting the portions of the passages formed in each plate with a resin to fill said passage portions.

4. A process as in claim 2, further comprising the step of:
   (6) removing the molded article from the mold before performing the heating step.

5. A process as in claim 3, further including the step of:
   heating the molded article to remove all resin from the article and to fuse the intra- and inter-plate inorganic particles into a homogenous solid.

6. A sequential process for forming a molded article from molded plates formed in sequence in serial abutment with each other in a mold, said mold having a cavity therein defined by walls the back wall being movable and one or more of the other walls bearing injector openings, dies for forming passages within said plates projecting from said movable wall toward one of the non-movable walls, said process comprising the steps of:
   (1) injecting a first mixture of inorganic particles and a resin binder into said cavity between the die-bearing movable wall and said non-movable wall and molding a plate therefrom having passages formed by said dies;
   (2) moving said passage forming dies out of said plate;
   (3) injecting the passages formed in said molded plate with a resin, said resin filling the passages;
   (4) moving said movable wall away from said molded plate to form another cavity in said mold adjacent to said molded plate;
   (5) injecting another mixture of inorganic particles and resin binder into the cavity formed in step 4 to mold another plate;
   (6) moving said passage forming dies out of said plate;
   (7) injecting the passages formed in said plate molded in step 5, with a resin, said resin filling the passages formed in said plate; and
   (8) repeating steps 4, 5, 6 and 7 as many times as desired to form a stack of abutting, molded plates which comprise a molded article containing passages therein formed by said dies.

7. A process as in claim 6, further including the step of:
   heating the molded article to remove all resin from the article and to fuse the intra- and inter-plate inorganic particles into a homogenous solid.

* * * * *